3,406,147
CROSS-LINKED POLYPHENYLENE OXIDE
Seymour Schmukler, Dalton, Mass., assignor to General
Electric Company, a corporation of New York
No Drawing. Filed May 13, 1966, Ser. No. 549,814
7 Claims. (Cl. 260—47)

ABSTRACT OF THE DISCLOSURE

A polyphenylene oxide capable of crosslinking by the application of heat comprising a polyphenylene oxide containing acyloxy substituents distributed along the polymer backbone. Crosslinking of the polymer can take place by an electrophilic aromatic substitution reaction in the presence of a Lewis acid or by transesterification with a difunctional material reactive with acyloxy groups on the polymer backbone. Crosslinked polymers formed in this manner have good solvent resistance and will neither dissolve nor craze in their presence.

---

This invention relates to heat reactive polyphenylene oxide having crosslinking sites on the polymer chain.

The polyphenylene oxides are a body of thermoplastics disclosed in U.S. Patent Nos. 3,306,874 and 3,306,875, incorporated herein by reference. They are characterized by a unique combination of chemical, physical and electrical properties over a temperature range of more than 600° F., extending from a brittle point of minus 275° F. to a heat distortion temperature of 375° F. In particular, the polyphenylene oxides combine high tensile strength and tensile modulus with a high softening temperature, and excellent resistance to water, steam, strong acids and alkalies.

The polyphenylene oxides also have certain undesirable characteristics that are common to most thermoplastic materials. For example, their resistance to most common organic solvents is low. Aromatic and chlorinated hydrocarbon solvents dissolve phenylene oxide polymers, while other solvents and solvent vapors induce crazing in molded polyphenylene oxide parts under stress, causing loss of strength. The tensile properties of the resins decrease steadily with increasing temperature, and drop off sharply at about 200° C. Further, under extreme prolonged stress, molded parts formed from the polyphenylene oxides tend to creep, causing permanent deformation.

It is known that these disadvantages which are common to most thermoplastic materials, may be overcome by crosslinking the individual polymer molecules during, or after, the forming of the material into its final shape. Thus, if a sufficient number of crosslinking sites are present, the material can be crosslinked and will then no longer be soluble, but only swell to a greater or lesser extent. Also, while the phenomenon of solvent crazing is not fully understood, it appears to involve crystallization of the polymer molecules. As the mobility of the polymer molecule is limited by crosslinking, crystallization is no longer possible, and thus the problem of solvent crazing is removed. The limitation on molecular mobility also prevents the polymer from flowing, even above its melting point, thus preventing, to a large degree, creep and loss of tensile properties at increased temperature.

The polyphenylene oxides are, to a high degree, chemically inert, a desirable characteristic from a materials standpoint. However, because of this inertness the prior art has experienced difficulty in introducing crosslinks between polymer chains, and structurally different units generally, by simple chemical processes. For example, prolonged heating in air will render the polymer insoluble in aromatic or chlorinated hydrocarbon solvents, but the degree of crosslinking accomplished is quite low, and the materials produced swell to a considerable degree.

In accordance with the present invention, a polyphenylene oxide capable of crosslinking is formed by the introduction of a plurality of side-chain acyloxy groups on the polymer chain. Crosslinking is thereafter induced at elevated temperatures by aromatic substitution in the presence of a Lewis acid or by transesterification with a difunctional material reactive with an acyloxy group.

Accordingly, one object of this invention is to provide a potentially reactive, heat reactive polyphenylene oxide capable of crosslinking consisting of a polyphenylene oxide containing a plurality of polymer units having side-chain acyloxy groups.

Other objects and advantages of this invention will be in part apparent and in part pointed out in the description which follows.

The heat reactive polyphenylene oxides capable of crosslinking comprise from 0–99 mole percent of polymer units represented by the following general formula:

I 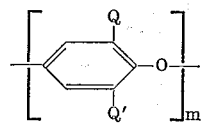

and from 1–100% of polymer units represented by the following general formula:

II 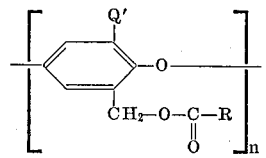

wherein in the above formulae, Q represents a monovalent substituent selected from the group consisting of hydrogen, hydrocarbon radicals free of a tertiary alpha carbon atom, i.e., alkyl, aryl, alkaryl, aralkyl, etc., halohydrocarbon radicals having at least 2 carbon atoms between the halogen atom and phenol nucleus and being free of a tertiary alpha carbon atom, hydroxycarbonoxy radicals having at least two carbon atoms and being free of an aliphatic tertiary alpha carbon atom and halohydrocarbonoxy radicals having at least two carbon atoms and being free of a tertiary alpha carbon atom; Q' is the same as Q and in addition, halogen; R is a member selected from the group consisting of hydrogen and lower alkyl, i.e., 1–6 carbon atoms; and the sum of $m$ plus $n$ is at least 10.

For brevity, the expression "heat curable polymer" will be used throughout the remainder of this specification to identify the polymers having polymer units corresponding to Formulas I and II above.

In the above formulas, the oxygen atom of one repeating unit is connected to the phenylene nucleus of the next repeating unit. It should be understood that the polymer units represented by Formula I and Formula II above are randomly distributed throughout each polymer chain.

The degree of crosslinking of the polymer is dependent upon the desired polymer properties. The greater the degree of crosslinking, the greater the resistance of the polymer to dissolving in various solvents. However, increasing the degree of crosslinking also causes embrittlement and structural rigidity of the polymer. In general, the degree of crosslinking is controlled by the number of acyloxy groups substituted on the polymer chain i.e., the number of polymer units corresponding to Formula II above. The polymer therefore contains from 0–99 mol percent of polymer units corresponding to Formula I, and from 1 to 100 mol percent of polymer units corresponding to Formula II.

The polyphenylene oxides containing the side-chain acyloxy groups can be formed in a number of ways. One method comprises reacting a brominating or chlorinating agent with a methyl substituted polyphenylene oxide, whereby bromine or chlorine readily substitutes on the methyl group to produce the corresponding mono, di- or tribromomethyl or mono-, di- or trichloromethyl groups. The resulting polymer has a repeating structural unit represented by the following general formula:

III 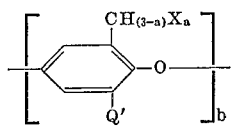

wherein Q' has the meaning noted above, X represents either chlorine or bromine, $b$ is a positive integer and is at least 10, and $a$ is a number from 0.01 to 3 inclusive and preferably 0.01 to 1.0 for purposes of the present invention. Details for this reaction can be found in copending U.S. Patent Application Serial No. 155,827 of Alan S. Hay, filed Nov. 29, 1961, now Patent No. 3,262,911, the contents of which are incorporated herein by reference. This material may then be reacted with sodium acetate to form the acyloxy substituent. It is desirable to perform this reaction in the presence of an ionizing aprotic solvent such as dimethylsufoxide, dimethylacetamide, N - methyl - pyrrolidone, tetramethylurea, tetramethylguanidine, dimethylformamide, etc. The reaction is preferably run under reflux conditions.

A second method for forming the heat curable polymers of this invention comprises oxidatively coupling a mixture of phenols in accordance with the process set forth in the above noted patents. The phenols would correspond to the following formulas:

IV 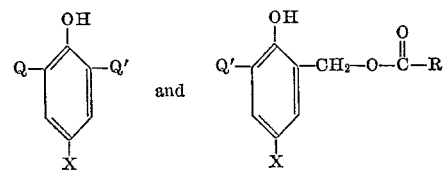

wherein Q, Q' and R are as defined above and X is a member selected from the group consisting of hydrogen and halogen. The process involves oxidatively coupling phenols in the presence of a complex catalyst formed from a copper salt and a primary, secondary or tertiary amine. The resulting polymer will consist of a random distribution of polymer units wherein a plurality of the units have a side-chain acyloxy group. The number of said polymer units containing the side-chain acyloxy group is dependent upon the concentration of the phenol having the side chain acyloxy group. This, in turn, is dependent upon the degree of crosslinking desired in the cured polymer.

There are two methods for crosslinking the heat curable polymer. One method comprises electrophilic substitution directly on the aromatic nucleus, wherein the acyloxy group forms the electrophile in the presence of a strong Lewis acid with the liberation of an acid. The second method comprises transesterification of the acyloxy group using a difunctional compound reactive therewith with liberation of acid or an ester of the acid.

When crosslinking is effected through electrophilic substitution using a strong Lewis acid, the crosslinking bridge between polymer chains is believed to be a methylene group attached to the position meta to the oxygen ether in one polymer chain and ortho to the oxygen ether in the second polymer chain. The Lewis acid is necessary to catalyze the reaction. By Lewis acid, it is meant those materials which will accept a share in the electrons of another molecule. The preferred Lewis acids for purposes of the present invention are those that are, (1) soluble in the same solvent as the heat curable polyphenylene oxide, and
(2) nonhalogenating.

This latter provision is not an absolute necessity, but is preferred inasmuch as the heat curable polyphenylene oxide in solution may be used as a coating composition for metals and the presence of a halogenating acid could damage the metal surface. In general, the preferred Lewis acid for purposes of the present invention is p-toluenesulfonic acid.

Curing of the polymer in the presence of a Lewis acid may be effected at elevated temperatures, preferably in excess of 75° C., for periods of time in excess of 10 minutes. It should be understood that higher temperatures require shorter curing times. The quantity of Lewis acid needed may vary between rather broad limits and is dependent upon the particular acid chosen. In general, the amount used should be that which is necessary to catalyze the reaction.

Details for aromatic electrophilic type substitution reactions can be found in "Structure and Mechanism in Organic Chemistry," C. K. Ingold, Cornell University Press, Ithaca, N.Y., 1953, pp. 206 to 212 and Chapter VI, the contents of which are incorporated herein by reference.

The second method of crosslinking the heat curable polymers involves what is believed to be transesterification with di- or multifunctional organic esters or acids reactive with the acyloxy group such an adipic acid, succinic acid, glutaric acid, sebacic acid, phthalic acid, terephthalic acid, etc. and esters thereof. When curing by this method, the residue of the reaction of the di- or multifunctional acid or ester and the acyloxy polymer unit serves as the crosslinking bridge between polymer chains. The quantity of ester or acid used to cure the polymer should not exceed 1 mole per 2 moles of acyloxy group. Heat is necessary to cure the polymer and temperatures in excess of 75° C. are preferred. A cure time of at least 10 minutes is desirable though the time is dependent upon the cure temperature and the reactivity of the acid and ester with the acyloxy group.

The following examples are set forth for purposes of illustration and should not be construed as limiting the invention. All percentages expressed in the examples are by weight unless otherwise indicated.

Example 1

This example illustrates a procedure for the preparation of side-chain chlorinated polyphenylene oxide.

The procedure comprises dissolving 300 grams of a poly-(2,6-dimethyl-1,4-phenylene)-oxide having an intrinsic viscosity of 0.64 deciliters per gram (dl./g.) as measured in chloroform at 30° C. in 2,050 milliliters (ml.) of chlorobenzene. To remove all water that may be present, the mixture was distilled until a clear distillate was obtained. Thereafter, the mixture was cooled to 90° C. and 80 ml. of phosphorus trichloride were added. The mixture was brought to reflux and 26 ml. of liquid chlorine were allowed to evaporate into the reaction mixture through a sintered glass diffusing tube. After all the chlorine was absorbed, the reaction was allowed to cool and the polymer precipitated by pouring the reaction solution slowly into four or five volumes of methanol in a Waring Blendor. The yield was about 95% of theoretical. The total chlorine concentration was determined by combustion in a Schöniger flask followed by titration of the chloride ion formed. It was found that the total chlorine content was 5.3%. Benzylic chlorine was found to be 4.9% and this was determined by reaction of the polymer with trimethyl amine and benzyl alcohol followed by silver nitrate titration of the ionic chloride.

Following the same procedures, three additional chlorinated polymers were formed with differing amounts of liquid chlorine additives. The following results were found:

| Sample Designation | Ml. of liquid chlorine | Percent benzylic chlorine | Percent total chlorine |
|---|---|---|---|
| A | 55 | 10 | 12 |
| B | 110 | 15 |  |
| C | 165 | 22 | 27 |

Example 2

This example represents the reaction of the side-chain chlorinated polyhepnylene oxide with sodium acetate.

Employing the side-chain chlorinated polyphenylene oxide of Example 1 designated B, a solution was prepared containing 10.3 grams of the polymer, 7 grams of fused sodium acetate, 1 gram of tri-n-butyl-amine and 50 ml. of distilled dimethylformamide. The mixture was refluxed for one hour. It was then allowed to cool and poured into a Waring Blendor containing water. The rubbery solid that formed was then washed in the Waring Blendor three times with 100 ml. portions of water and finally with 100 ml. of methanol. The material was dried in an oven at 80° C. and upon analysis, showed a carbonyl group at 5.70 microns, which is attributed to the acetate ester. The polymer was soluble in chloroform, toluene and xylene. It had an intrinsic viscosity of 0.27 dl./g. as measured in chloroform at 30° C. Its analysis showed 0.95% benzylic chlorine and 3.93% total chlorine.

Example 3

This example illustrates the crosslinking of the resin of Example 2 by the use of electrophilic aromatic substitution in the presence of p-toluenesulfonic acid.

A solution was prepared consisting of two grams of the resin of Example 2 and 38 grams of xylene. A second solution was prepared consisting of 0.17 gram of p-toluene-sulfonic acid monohydrate dissolved in 10 grams of ethanol. One gram of the first solution was added to one ml. of ethanol and thereafter, 0.5 ml. of the second solution was added. The mixture was poured into an aluminum pan and heated to 400° F. for thirteen minutes. The pan was thereafter dissolved by immersion in 3 N hydrochloric acid. The aluminum pan dissolved leaving a film of highly crosslinked polymer. An attempt was made to dissolve this film in xylene, a normally good solvent for the polyphenylene oxide. It was found that the film did not dissolve in the xylene.

Example 4

This example is a further illustration of the formation of a side-chain acyloxy group on a polyphenylene oxide.

In this example, 10.3 grams of a chlorinated poly-(2,6-dimethyl-1,4-phenylene)-oxide having an intrinsic viscosity of 0.4 dl./g. as measured in chloroform at 30° C. and containing 6.65% benzylic chlorine and 7.9% total chlorine was heated with 100 ml. of dimethyl-formamide, 0.2 gram of tri-n-butylamine and 8 grams of anhydrous sodium acetate for 1 hour and 32 minutes. For the last half hour, temperature was maintained at approximately 150° C. Thereafter, the solution was allowed to cool and was poured slowly into a Waring Blendor containing water. The solid was filtered off and washed with one portion of water and then twice with methanol in the blender. The solid was then dried in an oven maintained at 80° C. to give 9.83 grams of a material containing only 0.42% benzylic chlorine. The resin had an intrinsic viscosity of 0.76 dl./g.

Example 5

Using the resin of Example 2, a solution was prepared by dissolving 1.5 grams of the resin in 18.5 grams of chlorobenzene. This solution was designated solution A. A second solution was prepared by dissolving 1.89 grams of p-toluene sulfonic acid monohydrate in 28.11 grams of tetrahydrofuran. This solution was designated solution B. A number of different mixtures were prepared from these two solutions containing increasing quantities of solution B. In each case, the mixture was poured onto an aluminum pan and heated as shown in Table 1 under Cure Schedule. Thereafter, in each case, the aluminum foil was dissolved with 3 N hydrochloric acid. To determine the degree of crosslinking, the films so produced were immersed in a solvent and the linear swelling ratio, α, was then determined. The ratio is determined by placing a measured length of film under a microscope and adding a swelling solvent to its surface. The increase in length of the film was measured at equilibrium. The length after swelling divided by the initial length of the film is designated as α, the linear swelling ratio. The following results were obtained:

TABLE I.—SWELLING RATIO FOR CROSSLINKED RESINS

| Amount of p-toluene sulfonic acid (mg.) | Cure Schedule (min.) | | α |
|---|---|---|---|
| | 260° F. | 450° F. | |
| 0 | 17 | 15 | >2.00 |
| 0 | 17 | 37 | >2.00 |
| 1.24 | 17 | 15 | >2.00 |
| 1.24 | 17 | 37 | >2.00 |
| 2.48 | 17 | 15 | 1.67 |
| 2.48 | 17 | 37 | 1.41 |
| 6.20 | 17 | 15 | 1.33 |
| 6.20 | 17 | 37 | 1.44 |
| 12.40 | 17 | 15 | 1.02 |
| 12.40 | 17 | 37 | 1.02 |

As can be seen from the above table, the swelling ratio decreases as the concentration of p-toluene sulfonic acid increases. The lower the value of α, the greater the degree of crosslinking as lower values indicate that polymer was sufficiently crosslinked to prevent swelling. Thus, with no addition of p-toluene sulfonic acid, it can be seen that the film stretched in one dimension in excess of twice its original length. The same is also true with addition to only 1.24 milligrams of p-toluene sulfonic acid as this amount was insufficient to effect substantial crosslinking. However, when the quantity of p-toluene sulfonic acid increased to 12.40 milligrams, substantially no swelling took place as indicated by the low α value of 1.02. It should be understood, of course, that a value of 1.00 indicates that the film maintained its original length and did not swell.

EXAMPLE 6

This example illustrates a proces for cross-linking of a polyphenylene oxide containing a side chain acyloxy group using a di-ester as the cross-linking agent.

Using the resin of Example 2, a solution was prepared using 2 grams of the resin dissolved in 38 grams of xylene. Thereafter, 0.8 gram of dimethylphthalate were added to 10 grams of the solution. This mixture was designated solution D. A second solution comprising tin octoate dissolved in xylene was prepared and designated solution E. A number of mixtures of solution D and E were made. In all cases, 1.28 grams of solution D were used. The quantity of solution E that was used is set forth in Table II. The mixtures were poured into aluminum pans and cured according to the schedule specified in Table II. The films were removed from the pans by dissolving the pans in 3 N hydrochloric acid. The linear stretch ratio was determined using the procedures set forth in Example 5 above. The linear stretch ratios obtained are set forth below.

TABLE II.—SWELLING RATIO FOR CROSSLINKED RESIN

| Amount of Catalyst (mg.) | Cure Schedule | | α |
|---|---|---|---|
| | 480° F. (min.) | 315° F. (days) | |
| 5.5 | 15 | 0 | 1.74 |
| 11.0 | 15 | 0 | 1.71 |
| 11.0 | 30 | 0 | 1.68 |
| 5.5 | 15 | 2½ | 1.00 |
| 11.0 | 15 | 2½ | 1.00 |
| 11.0 | 30 | 2½ | 1.02 |

As is evident from the above table, the long duration heat treatment resulted in a resin that was highly crosslinked as illustrated by the linear stretch ratios of 1.00. In addition, it was found that the heat treated polymers, though tightly crosslinked, were more flexible than the same unmodified polymer subjected to the same heat treatment.

The heat curable resins of the present invention have many uses. However, they are particularly well suited for use as a coating composition. It has been found that these materials when coated in solution form on a metal surface and thereafter cured, have excellent adhesion to the metal surface. In addition, when used with the proper solvents, the resin solutions have a high speed of drying, are relatively stable upon aging, are highly impervious to moisture, and in fact, show a higher degree of water resistance than the top quality varnishes and lacquers. Also, the resins have the properties of the polyphenylene oxides, and thus, are highly durable. The high thermal resistance, of the polyphenylene oxides render them suitable for many aplications that would not be possible with other similar polymeric materials. In addition, the high electrical resistance of the polyphenylene oxides render them desirable for many electrical applications.

The manner of using the heat curable polymers of this invention as a coating composition comprises applying a thin coating of the polymer in solvent along with (1) a catalyst to initiate the electrophilic substitution, or (2) a catalyst and a difunctional compound as discussed above if the curing takes place through transesterification. The coated sample is thereafter baked in an oven at elevated temperatures for the necessary time to effect crosslinking. In addition, pigments and plasticizers and other conventional lacquer materials may be added to the composition.

It should, of course, be apparent to those skilled in the art that changes may be made in the particular embodiments of the invention described which are within the full intent and scope of the invention as defined by the appended claims.

What I claim as new and desire to secure by Letters Patent of the United States is:

1. A crosslinked polyphenylene oxide formed by an electrophilic aromatic substitution reaction between adjacent polymer chains having the units
    (a) from 0 to 99 mole percent of first polymer units having the formula

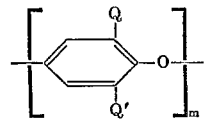

wherein Q is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals having at least two carbon atoms atoms and being free of a tertiary α-carbon atom, and halohydrocarbonoxy radicals having at least two carbon atoms between the halogen atom and phenol nucleus and being free of a tertiary α-carbon atom; and Q' is the same as Q and in addition, halogen; and
    (b) from 1 to 100 mole percent of second polymer units having the formula

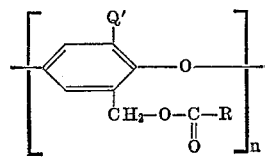

wherein Q' has the meaning noted above, R is selected from the group consisting of hydrogen and lower alkyl and the sum of $m$ and $n$ is a whole integer of at least 10; each crosslinking bridge comprising a methylene radical joined to the aromatic nucleus on adjacent polymer chains.

2. The crosslinked polymer of claim 1 wherein Q' in both said first and second polymer units and Q in said first polymer units are methyl.

3. The composition of claim 1 wherein the polymer contains from 15 to 85 mole percent of said first polymer units and from 85 to 15 mole percent of said second polymer units.

4. A crosslinked polyphenylene oxide that is the reaction product of a member selected from the group consisting of organic esters and acids reactive with acyloxy groups and adjacent polyphenylene oxide chains having the units
    (a) from 0 to 99 mole percent of first polymer units having the formula

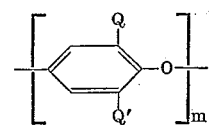

wherein Q is a monovalent substituent selected from the group consisting of hydrogen, hydrocarbon radicals free of a tertiary α-carbon atom, halohydrocarbon radicals having at least two carbon atoms between the halogen atom and phenol nucleus and being free of a tertiary α-carbon atom, hydrocarbonoxy radicals having at least two carbon atoms and being free of a tertiary α-carbon atom, and halohydrocarbonoxy radicals having at least two carbon atoms between the halogen atom and phenol nucleus and being free of a tertiary α-carbon atom; and Q' is the same as Q and in addition, halogen; and
    (b) from 1 to 100 mole percent of second polymer units having the formula

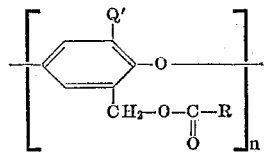

wherein Q' has the meaning noted above, R is selected from the group consisting of hydrogen and lower alkyl and the sum of $m$ and $n$ is a whole integer of at least 10.

5. The crosslinked polyphenylene oxide of claim 4 wherein Q' in both said first and second polymer units, and Q in said first polymer units are methyl.

6. The crosslinked polyphenylene oxide of claim 4 wherein the member reacted with the acyloxy group is selected from the group consisting of adipic acid, succinic acid, glutaric acid, sebacic acid, phthalic acid, terephthalic acid, and esters thereof.

7. The crosslinked polyphenylene oxide of claim 4 wherein the member reacted with the acyloxy group is terephthalic acid.

References Cited

UNITED STATES PATENTS

| | | | |
|---|---|---|---|
| 3,262,911 | 7/1966 | Hay | 260—47 |
| 3,306,875 | 2/1967 | Hay | 260—47 |

WILLIAM H. SHORT, *Primary Examiner.*

M. GOLDSTEIN, *Assistant Examiner.*